United States Patent [19]

Swars

[11] Patent Number: 5,038,450
[45] Date of Patent: Aug. 13, 1991

[54] ASSEMBLED SHAFT

[75] Inventor: Helmut Swars, Bergisch Gladbach, Fed. Rep. of Germany

[73] Assignee: Emitec Gesellschaft fur Emissionstechnologie mbH, Lohmar, Fed. Rep. of Germany

[21] Appl. No.: 452,580

[22] Filed: Dec. 18, 1989

[30] Foreign Application Priority Data

Dec. 17, 1988 [DE] Fed. Rep. of Germany ....... 3842592

[51] Int. Cl.⁵ .............................................. B23P 17/00
[52] U.S. Cl. .................................... 29/421.1; 29/523; 29/888.08; 29/888.1
[58] Field of Search ............... 29/888.1, 888.08, 523, 29/522.1, 505, 421.1, 527.2; 74/595, 567

[56] References Cited

U.S. PATENT DOCUMENTS 4,809,562  3/1989  Berdoraitas et al. ................ 74/567
4,899,615  2/1990  Matt ..................................... 74/567

FOREIGN PATENT DOCUMENTS

2418599  10/1975  Fed. Rep. of Germany .
3245530   6/1984  Fed. Rep. of Germany .
0150624   8/1984  Japan ................................. 29/888.1

Primary Examiner—Irene Cuda
Attorney, Agent, or Firm—Toren, McGeady & Associates

[57] ABSTRACT

A process for producing an assembled crankshaft, transmission shaft or camshaft, in the case of which expansion of the inserted sleeves takes place for the purpose of producing a force-locking connection between slid-on drive elements or bearing sleeves and tubular members, and where bored plugs are inserted, so as to be pressure-agent-proof, into the open ends of a sleeve with the cavity formed by the sleeve and the inserted plugs being pressurized by a pressure agent up to the point of permanent radial deformation of the sleeve.

22 Claims, 6 Drawing Sheets

ASSEMBLED SHAFT

BACKGROUND OF THE INVENTION

The invention further relates to a process for producing an assembled shaft, especially a crankshaft, transmission shaft or camshaft, in which sleeve members are inserted into tubular members and expanded, thereafter remaining permanently deformed. The tubular members abut each other and/or are inserted into each other and/or drive elements or bearing sleeves are slid on to the tubular members. The expansion of the sleeves takes place for achieving a forcelocking connection between the sleeve elements and the abutting tubular members or between the tubular members inserted into each other or between the bearing sleeves and the tubular members.

There are prior art assembled shafts which, because of their reduced mass, have advantages as compared to solid forged or cast shafts, and also as compared to hollow cast shafts.

Several different processes for producing the above-mentioned shafts are known and operate with pressure agent probes provided with seals, with the outer diameter of the probes essentially corresponding to the inner diameter of the sleeves. The seals, which are subjected to pressures of several thousand bar, suffer from considerable wear during the application of pressure and also during the insertion and withdrawal of the probe so that they have to be replaced at regular intervals. Because the seals, due to their short service life, have a tendency to fail unexpectedly, the shaft in the process of being produced is destroyed.

SUMMARY OF THE INVENTION

Accordingly, it is an object of the present invention to provide a process for producing a shaft of the above type in a design which results a reduction in masses and ensures a good torsional and bending strength.

It is a further object of the invention to provide a process of the initially mentioned type for producing such shafts and an assembly suitable for executing it, in the case of which it is possible to eliminate probes with multiple seals of the conventional type and which reduces the causes of defects while at the same time being cost effective.

Pursuant to these objects, and others which will become apparent hereafter, one aspect of the present invention resides in providing an assembled shaft wherein the hollow shaft is composed of individual tubular members which, with their end regions, have been inserted into the drive elements or bearing sleeves and which, outside same, relative to their inner diameter, have a stepped enlarged outer diameter. The tubular members, within a drive element or a bearing sleeve, abut each other or are inserted into each other. The sleeves within the drive elements or bearing sleeves are inserted into the tubular members abutting or inserted into each other, and the tubular members are connected in an at least force-locking, possibly material-locking way to the drive elements or bearing sleeves and sleeves.

Since the diameter of the tubular members forming the carrying structure of the shaft is enlarged relative to the apertures of the drive elements, the shafts have a high torsional and bending strength. The steps of the tubular members may rest against and thus are supported on the flanks of the drive elements, which has an advantageous effect on the bending strength. With the thin walled design of the tubular members, the force-locking connection is ensured by the inserted sleeves which are reduced to the required portions within the drive elements in order to reduce the masses.

To produce the force-locking connection, the sleeves may be pressed, or shrunk in, or the drive elements may be shrunk on. Furthermore, the sleeves may be either mechanically or hydraulically expanded beyond their limit of elasticity, using pressure agent probes which are known in the art.

A particularly suitable process in accordance with the invention includes sliding bored lugs into the open ends of a sleeve so as to be pressure-agent-proof, and pressurizing the cavity formed by the sleeve and the inserted plug, via the plug boreholes, by a pressure medium until the sleeve is permanently radially deformed.

In a first embodiment, a coating covering at least the free inner face of the sleeve and the outer region of the end face of the plugs is introduced into the cavities, especially via the plug boreholes, prior to the pressure being applied.

By means of the process described here it is possible to apply a coating or film-like substance to the sleeve interior which substance may sealingly penetrate into the sealing gap existing between the plug and sleeve in order to ensure perfect sealing. The coating represents a lost material used only once, which in some cases may partially remain in the sleeve, even after expansion has taken place.

In contrast to sealing rings repeatedly used on probe members, where damage is caused if they penetrate into the sealing gap, penetration of the coating is not only harmless to the process, but actually suitable for enhancing the sealing effect.

There are several different possibilities for applying the process, for example, after the sleeves and plugs have been inserted into each other, an internal coating may be sprayed on by a nozzle introduced through one of the plug boreholes.

In a further embodiment, the sleeves and plugs inserted into each other may be lined with a highly viscous fluid which adheres to the walls, with the assembly preferably being turned around all axes.

A third possibility for applying the coating includes a tube consisting of a plastically easily deformable material being inserted through the plug boreholes and being subjected to internal pressure so that it rests against the sleeve wall.

The coating material may be any suitable metal with a low melting point, or other hardenable, organic substances.

According to a second embodiment of the invention, the annular gaps existing between the sleeve and plugs in the cavity may be sealed by easily deformable seals which are made especially of plastics or soft metal, which are fitted simultaneously with insertion of the plugs and which, under the influence of the internal pressure, rest against the inner annular gaps in the cavity in such a way that the system is totally sealed.

A modification of the above includes the plugs being inserted into the sleeves with a press fit, in which case it may be possible to eliminate seals altogether. This applies especially in those cases where the press fit, which may also be produced by thermal shrinking, for example, is maintained during the entire process of radial deformation of the sleeve. In this case, the plugs would remain in the completed tube.

According to a further embodiment, the plugs may be inserted into the sleeve so as to form a press fit, but with the press fit being dimensioned so that it is released during the radial deformation of the sleeve and so that the plugs may subsequently be removed. This process requires the above-mentioned additional means for sealing the cavity.

A further advantageous embodiment of the process includes using a highly viscous medium as a pressure fluid, for example wax, which sealingly settles in the annular gaps in the cavity between the plug and sleeve and permits a pressure build-up without there being any special need for sealing elements. A pressure increase by means of water or any other medium with a lower viscosity may then be effected in the region of the plug boreholes or, in the case of a multiple assembly, in the region of the boreholes of the respective outer plugs.

The plugs through whose boreholes the pressure fluids are introduced should preferably be connected to a pressure generator and this connection, too, has to be sealed. In this case, seal failure is harmless. In the case of plugs used repeatedly, the connection may be a totally safe, conventional high-pressure connection.

If only one sleeve is expanded in accordance with the process as proposed by the invention, it is appreciated that, if the plug boreholes are arranged horizontally, one borehole may be used for introducing the pressure fluid and the other one may serve ventilation purposes. If the plugs are arranged vertically, one of the plugs may be designed as a bore-less dummy plug.

As a rule, several identical sleeves are deformed on one shaft, and it is therefore particularly advantageous if a continuous plug with a continuous bore is inserted into the ends of two adjoining sleeves.

To facilitate insertion of the plugs by a limited amount, they are preferably provided with annular steps or other stops.

A particularly advantageous assembly for carrying out the process in accordance with the invention consists in preassembled units having at least one sleeve and two plugs which are provided with an inner coating before being inserted into the tubular member(s) which are to be connected with each other and/or on which elements are to be attached. If the plugs have been provided with the above-mentioned stops, only the outer plugs have to be fixed prior to the application of internal pressure in order to ensure axial security of the entire assembly during the subsequent application of internal pressure to the sleeves.

A pre-assembled unit of sleeves and plugs is preferably designed in such a way that the plugs are already inserted into the ends of the sleeves so as to form a press fit.

This measure facilitates overall assembly as well as sealing by the inner coating. When the sleeves are expanded, the press fit is released and the plug may easily be pushed out axially. The complete assembly consisting of inserted tube members and sleeves fitted with plugs is preferably placed in a kind of die fixing the angular positions of the elements and tubular members and at the same time accommodating the axial reaction pressure of the plugs axially exposed at one end.

In a particularly simple manner, the pressure may be generated within the device itself by sealing and axially displacing the outermost plugs or by pressing small pistons into the through-boreholes of the respective axially positioned outer plugs, provided the interior of the sleeves and through-boreholes was previously filled with a pressurized medium, preferably water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
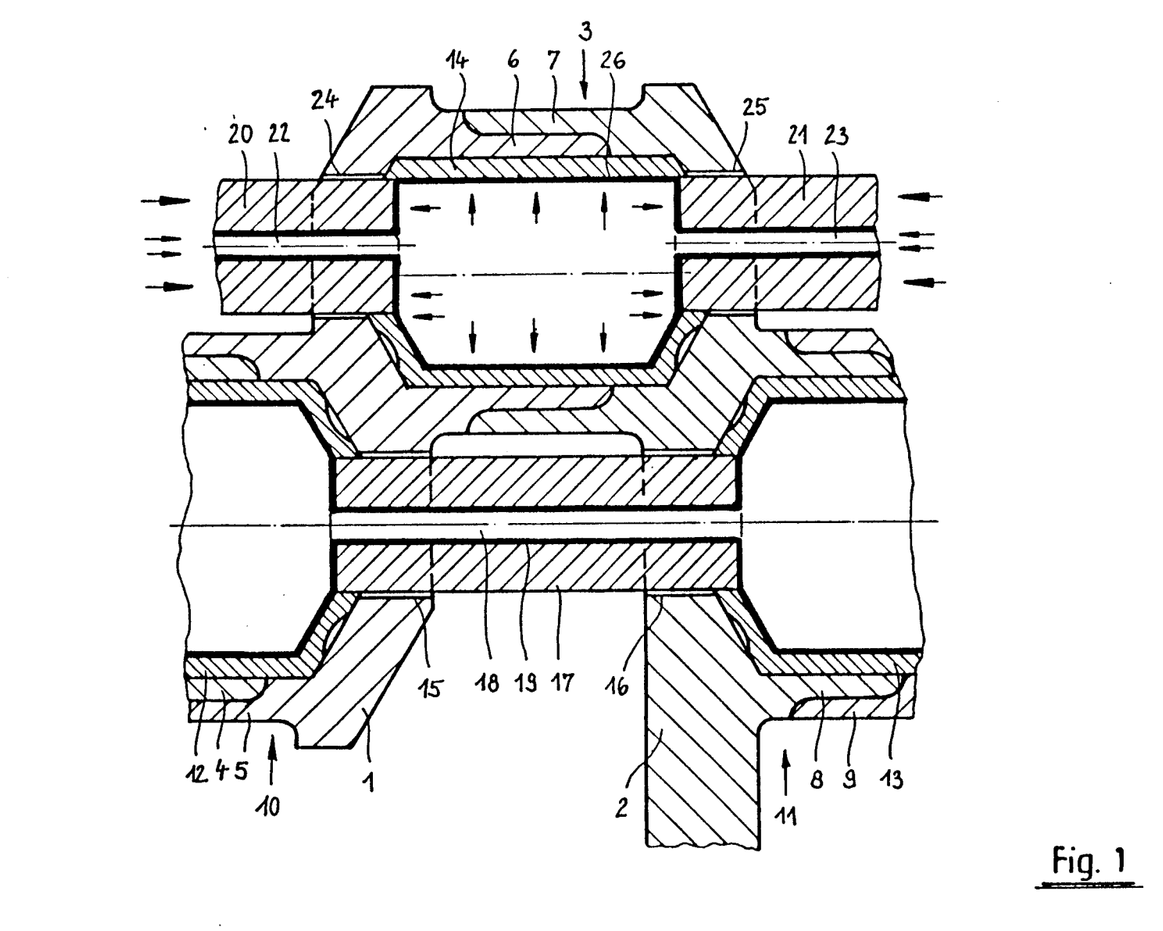
FIG. 1 shows an assembly for producing an assembled crankshaft.

FIG. 1 shows a portion of a crankshaft comprising two crank webs 1, 2, with the latter web 2 being provided with a counter weight. The crank webs 1, 2 have been provided with pin projections 5, 6, 7, 8 designed of tubular pieces which are fittingly inserted into corresponding projections 4, 9 of adjoining webs so as to form a bearing pin 10, 11 or a crank pin 3. Into the inserted pin parts 4, 5; 8, 9 of the bearing pins 10, 11 there have been inserted symmetrical sleeves 12, 13 and into the inserted pin parts 6, 7 of the crank pin 3 there has been inserted an asymmetrical sleeve 14. A plug 17 with a small through-borehole 18 has been inserted into the sleeves 12, 13 facing each other and through boreholes 15, 16 in the crank webs 1, 2. The entire inner surface of the sleeves 12, 13 as well as the free faces of the plug 17 including the inner borehole 18 have been provided with a coating 19 which, in particular, seals the annular gap between the plugs and sleeves.

Two plugs 20, 21 passing through the apertures 24, 25 of the crank webs have been inserted into the two apertures of the sleeve 14. Again, it is possible to identify a coating 26 lining the inner face of the sleeve 14 and the end faces of the plugs 20, 21 including their respective inner boreholes 22, 23.

As can be seen in respect of plug 17, those plugs extending into adjoining sleeves are balanced in respect of any forces, even when during the application of pressure so that they do not need any special securing means. Securing means are required only for the non-illustrated plugs in their end position. After completion of the shaft, the plugs can easily be pressed out because the diameter of the sleeves 12, 13, 14, 36, 37 has been permanently expanded.

Figure 2:
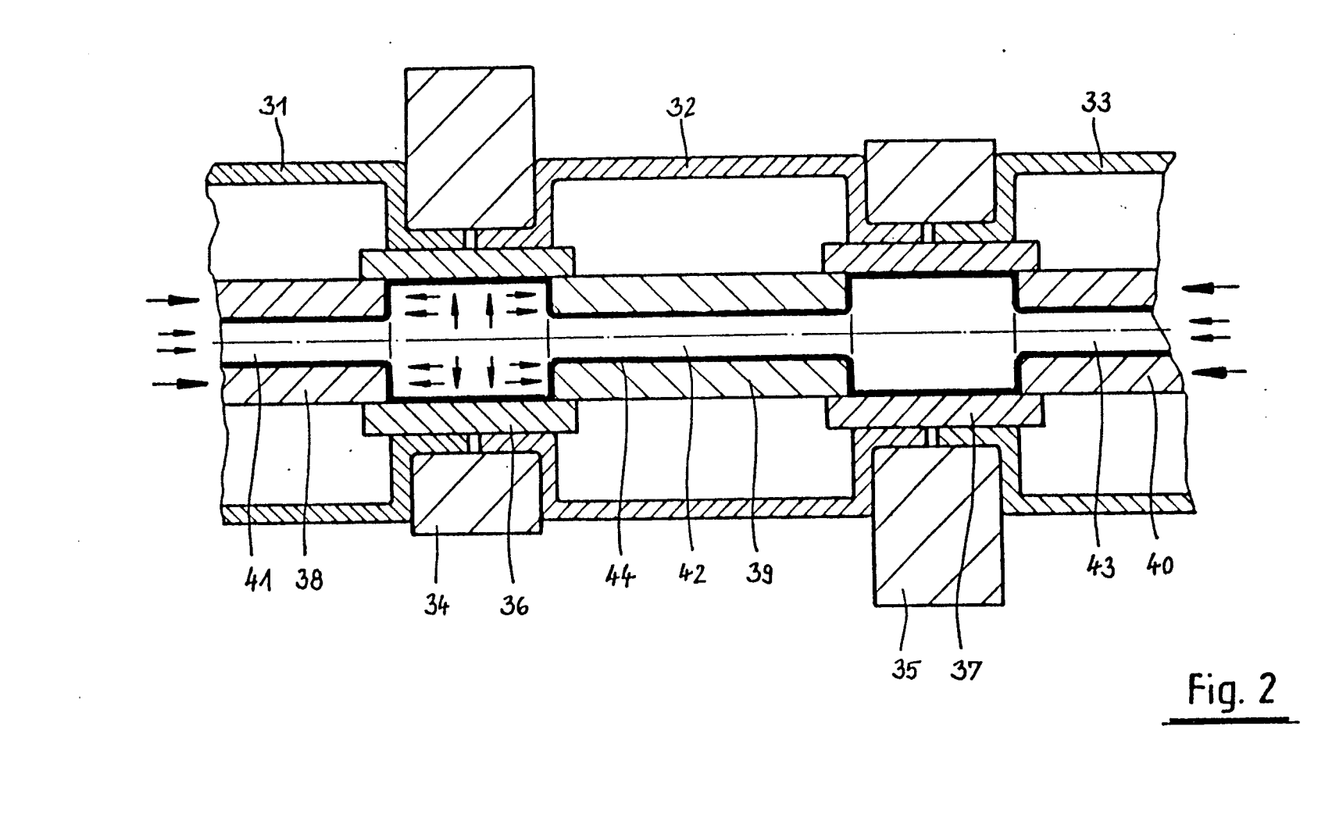
FIG. 2 shows an assembly for producing a first embodiment of an assembled crankshaft pursuant to the present invention.

FIG. 2 shows a portion of a camshaft consisting of individual, stepped tubular members 31, 32, 33 with cams 34, 35 having been slid on to their ends as elements to be attached and with purely cylindrical sleeves 36, 37 having been inserted into the respective tubular regions.

Into the ends of these sleeves 36, 37 there have been inserted plugs 38, 39, 40 with through-boreholes 41, 42, 43, with the center plug (in FIG. 2) extending with its ends into the two adjoining sleeves 36, 37. The free inner region of the sleeves 36, 37, as well as the end faces of the plugs 38, 39, 40 and their inner boreholes 41, 42, 43, are lined with a coating 44. The unit consisting of sleeves and plugs including the coating may be inserted in a pre-assembled condition into the tubular portions 31, 32, 33 with their attached drive elements 34, 35 and remain there after the application of internal pressure and elastic expansion of the sleeves 36, 37 or the unit may be removed from the completed shaft.

Figure 3:
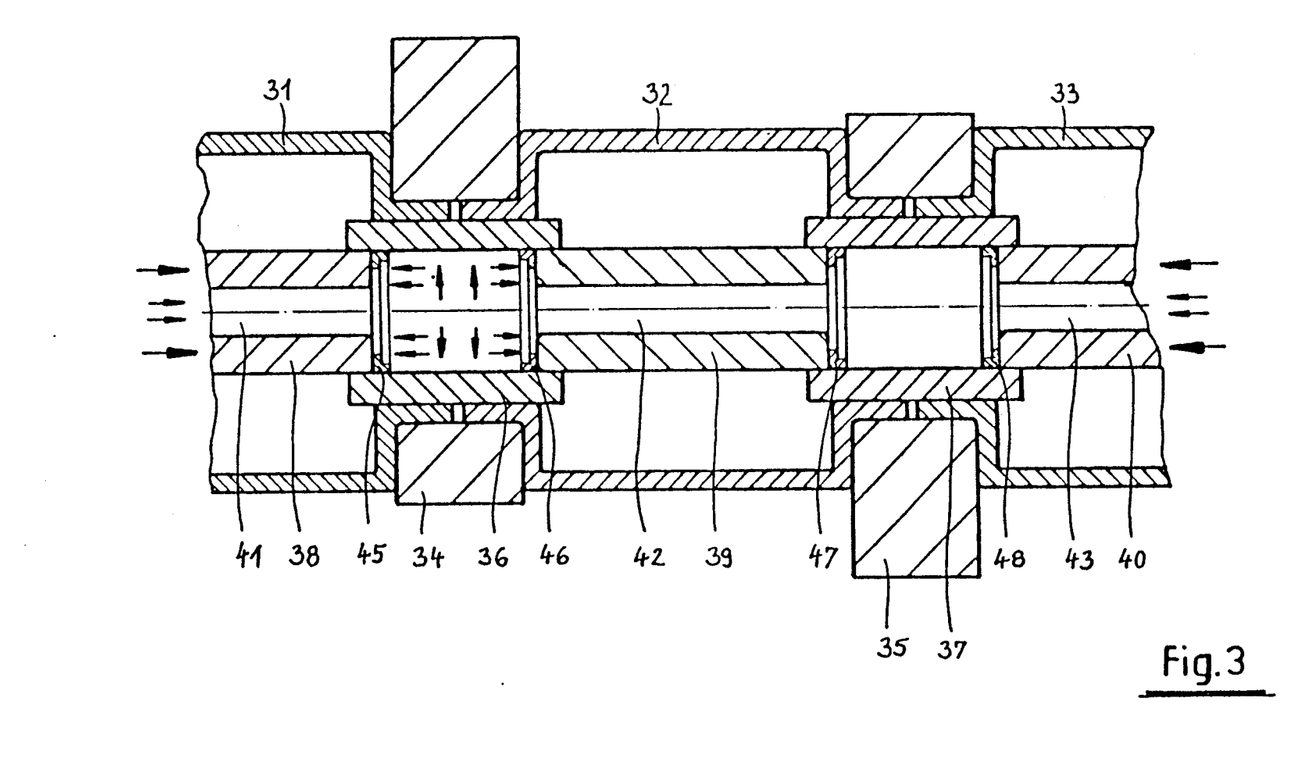
FIG. 3 shows an assembly for producing a second embodiment of an assembled camshaft.

FIG. 3 shows an assembly which is essentially the same as that shown in FIG. 2, with the same reference numbers being used. Instead of the coating, easily deformable sealing rings 45, 46, 47, 48 have been inserted in front of the plug.

Figure 4:
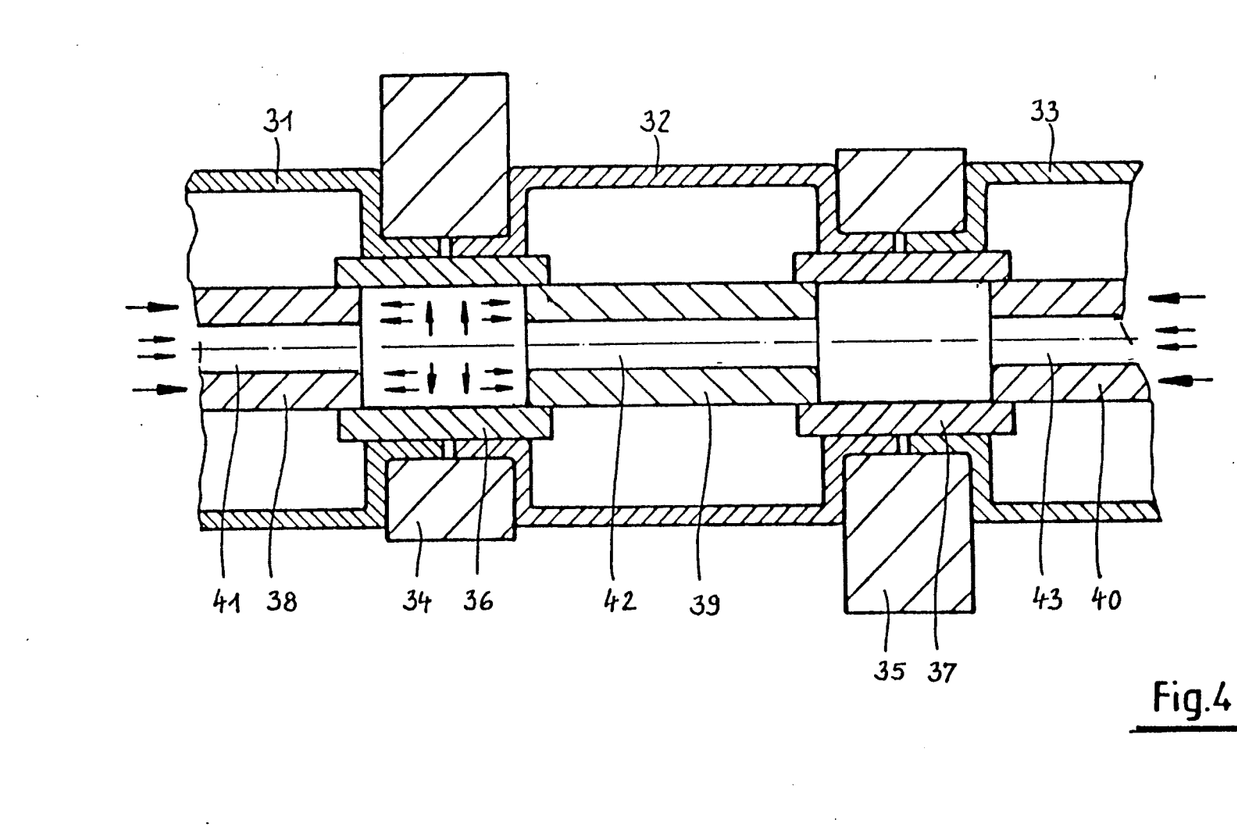
FIG. 4 shows an assembly for producing a third embodiment of an assembled camshaft.

The assembly illustrated in FIG. 4 is essentially the same as that shown in FIG. 3, but it does not comprise any sealing rings, which means that there is required a press fit which cannot be released even when the sleeves 36, 37 are radially expanded. Alternatively, it is necessary to provide a highly viscous fluid closing the gaps between the plugs 38, 39 40 and the sleeves 36, 37.

Figure 5:
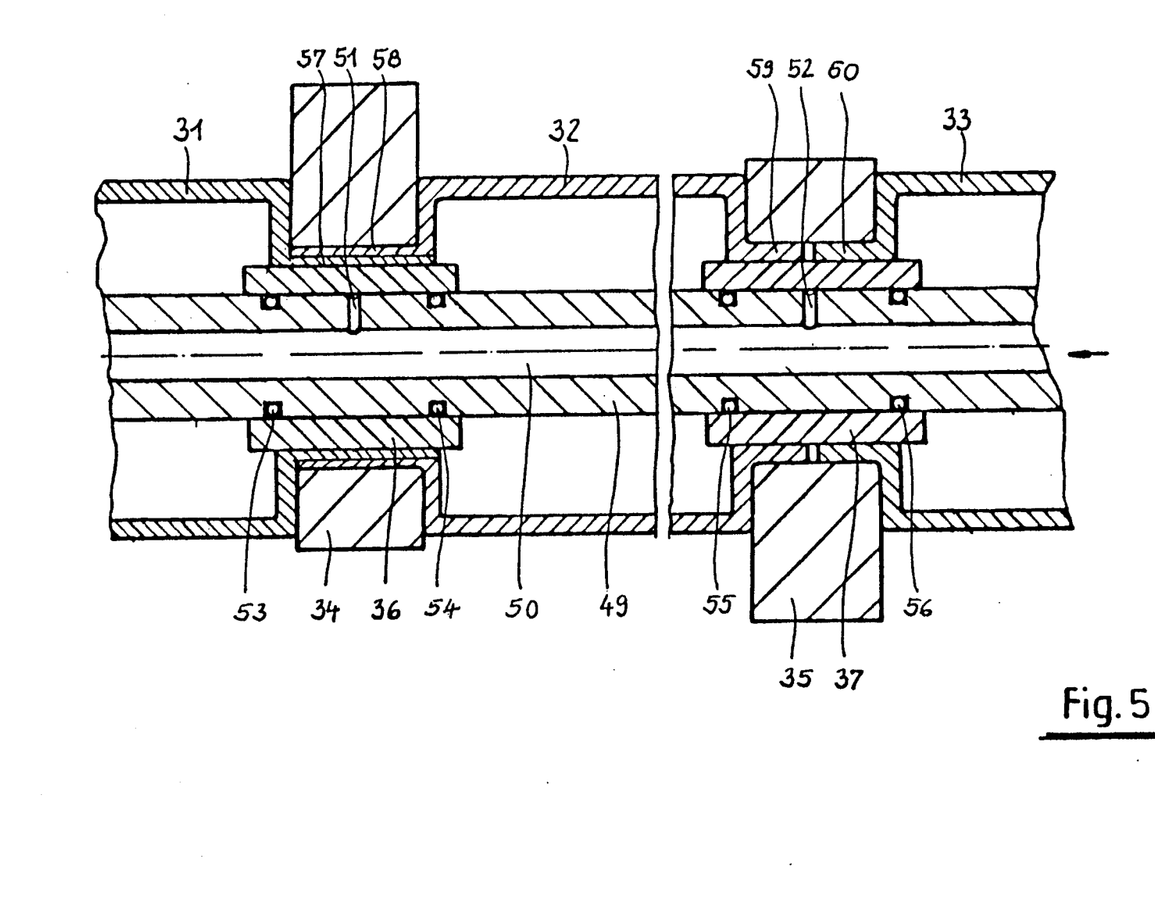
FIG. 5 shows a prior art pressure agent probe for producing a camshaft in accordance with the invention.

FIG. 5 shows a pressure agent probe 49 which is inserted into a camshaft composed of cams 34, 35 and tubular pieces 31, 32, 33 as well as sleeves 36, 37. The probe 49 comprises an inner bore 50, radial bores 51, 52 and seals 53, 54, 55, 56 arranged in pairs and symmetrically relative to the radial bores 51, 52. When pressure is applied, the sleeves 36, 37 are deformed radially beyond their limit of elasticity, thereby producing a force-locking connection of the tubular pieces 31, 32, 33 in the region of the cams.

In the left-hand half of FIG. 5 the end pieces 57, 58 of the tubular pieces 31, 32 are inserted into each other, whereas in the right-hand half of the figure, the end pieces 59, 60 of the tubular pieces 32, 33 have the same diameter, abutting against each other at half the length of the cam 35.

Figure 6:
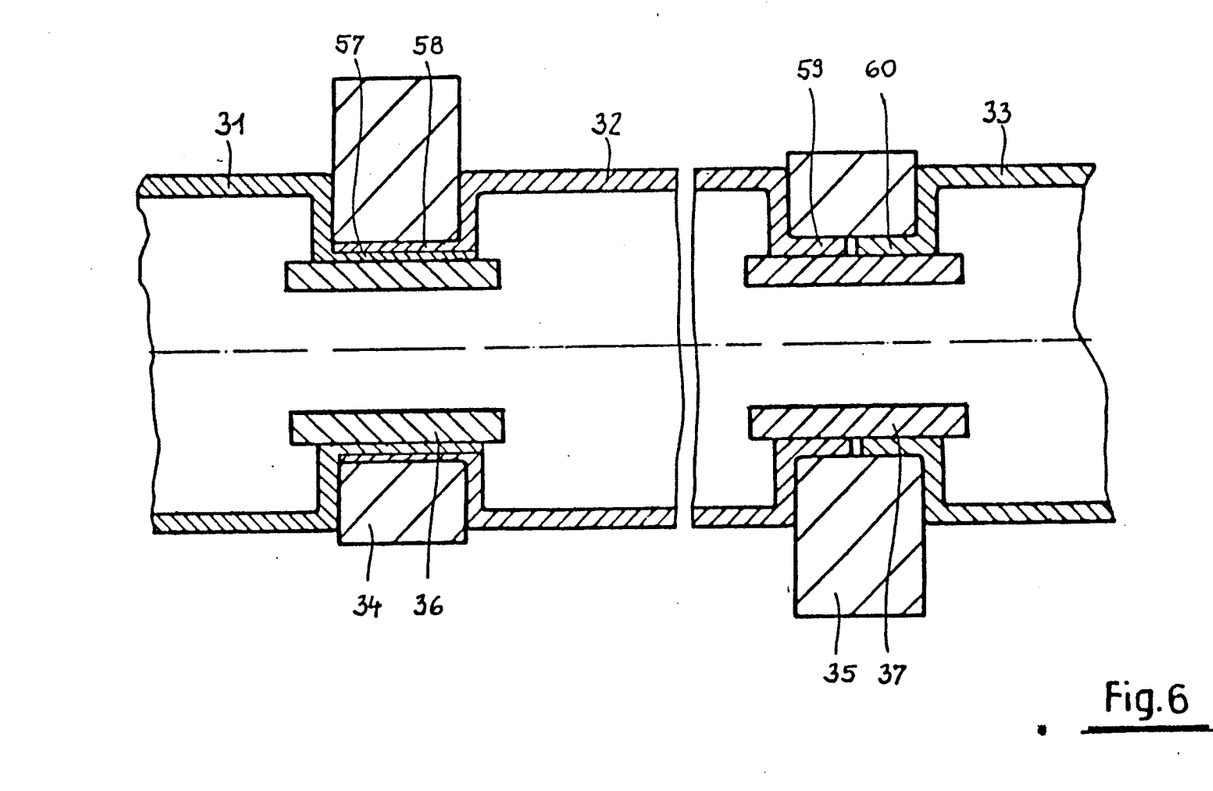
FIG. 6 illustrates a camshaft in accordance with the invention.

FIG. 6 has the same reference numbers as FIG. 5 and shows a finished camshaft in accordance with the invention which may be produced in accordance with one of the abovedescribed processes or by other methods such as shrinking or pressing, or it may comprise material-locking connections achieved by welding or soldering.

While the invention has been illustrated and described as embodied in an assembled shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A process for producing an assembled shaft, comprising the steps of:
    providing tubular members;
    inserting sleeve members into the tubular members so that the sleeve members span junctions of abutting tubular members;
    expanding the sleeve members so as to remain permanently deformed, with the tubular members abutting each other and with the expansion of the sleeve members taking place for achieving a force-locking connection between the sleeve members and the abutting tubular members;
    sliding bored plugs (17, 20, 21, 38, 39, 40) into open ends of the sleeve members (12, 13, 14, 36, 37) so as to form a pressure-agent-proof cavity; and
    pressurizing the cavity formed by the sleeve members (12, 13, 14, 36, 37) and the inserted plugs (17, 20, 21, 38, 39, 40) with a pressure medium until the sleeve members (12, 13, 14, 36, 37) are permanently radially deformed.

2. A process according to claim 1, and further comprising introducing a coating (19, 26, 44) covering at least an inner face of the sleeve members (12, 13, 14, 36, 37) and an end face of the plug (17, 20, 21, 38, 39, 40) into the cavity prior to the pressurizing step.

3. A process according to claim 2, wherein the coating introducing step includes introducing the coating via boreholes (18, 22, 23, 41, 42, 43) in the plug.

4. A process according to claim 2, wherein the coating introducing step includes applying the coating (19, 26, 44) by introducing a liquid, hardenable mass into the sleeve members and plugs which are inserted into each other.

5. A process according to claim 4, wherein the coating introducing step includes applying the coating by one of turning and swivelling an assembly formed by the sleeve members and plugs.

6. A process according to claim 3, wherein the coating introducing step includes spraying on the coating (19, 26, 44) with a nozzle which is inserted through one of the plug boreholes, into the interior of the sleeve members and plugs inserted into each other.

7. A process according to claim 2, wherein the coating introducing step includes producing the coating (19, 26, 44) by inserting a plastically easily deformable material into an assembly consisting of sleeve members and plugs inserted into each other, and expanding the tube.

8. A process according to claim 1, and further comprising sealing annular gaps between the sleeve members (12, 13, 14, 36, 37) and the plugs (17, 20, 21, 38, 39, 40) in the cavity with easily deformable sealing rings.

9. A process according to claim 8, wherein the sealing step includes sealing with rings made of one of a plastic material and soft metal.

10. A process according to claim 1, wherein the step of sliding the bored plugs into the open ends of the sleeve members includes inserting the plugs (17, 20, 21, 38, 39, 40) into the sleeve members (12, 13, 14, 36, 37) so as to form a pres fit which is maintained during radial deformation of the sleeve members (12, 13, 14, 36, 37) during the pressurizing step.

11. A process according to claim 1, wherein the step of sliding the bored plugs into the sleeve members includes inserting the plugs (17, 20, 21, 38, 39, 40) into the sleeve members (12, 13, 14, 36, 37) to form a press fit, and releasing the press fit at the end of the radial deformation of the sleeve members (12, 13, 14, 36, 37).

12. A process according to claim 1, wherein the pressurizing step includes using a highly viscous medium closing the annular gaps between the sleeve members (12, 13, 14, 36, 37) and the plugs (17, 20, 21, 38, 39, 40) for applying pressure.

13. A process according to claim 12, wherein the pressurizing step includes using wax as the highly viscous medium.

14. A process according to claim 1, wherein the sleeve member inserting step includes arranging several equiaxial sleeve members (12, 13; 36, 37), the plug sliding step including inserting one plug (17; 39) into the open ends of two adjoining sleeve members (12, 13, 36, 37).

15. A process according to claim 1, and further including preassembling an assembly made up of at least one sleeve member (14, 12, 13, 36, 37) and plugs (20, 21, 17, 38, 39, 40) inserted into the one sleeve member prior to being inserted into the tubular members (6, 7, 4, 5, 8, 9, 31, 32, 33).

16. A process according to claim 1, wherein the pressuring step includes filling the interior of the sleeve members and boreholes in the plugs with a pressurized fluid, applying a low pressure and subsequently increasing the pressure.

17. A process according to claim 16, including increasing the pressure with a pressure generator sealingly connected to one of the plug boreholes.

18. A process according to claim 16, wherein the pressurizing step includes generating pressure in respective outer plugs by displacing them when closed plug boreholes are present.

19. A process according to claim 16, wherein the pressurizing step includes generating the pressure by introducing pistons into the boreholes of respective outer plugs.

20. A process according to claim 1, and further comprising sliding one of either drive elements or bearing sleeves onto the tubular members, the expansion of the sleeve members taking place for achieving a force-locking connection between the drive elements or bearing sleeves and the tubular members.

21. A process for producing an assembled shaft, comprising the steps of:
  providing tubular members and inserting them into each other;
  inserting sleeve members into the tubular members at junctions of the tubular members;
  expanding the sleeve members so as to remain permanently deformed, and the expansion of the sleeve members taking place at junctions between the tubular members for achieving a force-locking connection between the sleeve members and the tubular members inserted into each other;
  sliding bored plugs (17, 20, 21, 38, 39) into the open ends of the sleeve members (12, 13, 14, 36, 37) so as to form a pressure-agent-proof cavity; and
  pressurizing the cavity formed by the sleeve members (12, 13, 14, 36, 37) and the inserted plugs (17, 20, 21, 38, 39, 40) with a pressure medium until the sleeve members (12, 13, 14, 36, 37) are permanently radially deformed.

22. A process according to claim 21, and further comprising sliding one of either drive elements or bearing sleeves onto the tubular members, the expansion of the sleeve members taking place for achieving a force-locking connection between the drive elements or bearing sleeves and the tubular members.

* * * * *